(12) United States Patent
Yan

(10) Patent No.: US 7,215,524 B2
(45) Date of Patent: May 8, 2007

(54) PROTECTION DEVICE FOR POWER SOURCE AND ELECTRONIC DEVICE

(75) Inventor: Yu-Hu Yan, Taiping (TW)

(73) Assignee: Benq Corporation, Taoyuan (TW)

( * ) Notice: Subject to any disclaimer, the term of this patent is extended or adjusted under 35 U.S.C. 154(b) by 295 days.

(21) Appl. No.: 10/937,216

(22) Filed: Sep. 9, 2004

(65) Prior Publication Data

US 2005/0052797 A1    Mar. 10, 2005

(30) Foreign Application Priority Data

Sep. 10, 2003    (TW) .............................. 92124986 A

(51) Int. Cl.
*H02H 3/00*    (2006.01)

(52) U.S. Cl. .................................... 361/93.9

(58) Field of Classification Search ................. 361/93.9
See application file for complete search history.

(56) References Cited

U.S. PATENT DOCUMENTS

| | | | | |
|---|---|---|---|---|
| 3,527,997 A | * | 9/1970 | Nercessian | 323/277 |
| 3,665,253 A | * | 5/1972 | Stefani | 361/74 |
| 3,723,774 A | * | 3/1973 | Rogers | 361/101 |
| 3,753,078 A | * | 8/1973 | Hedel | 323/277 |
| 4,161,760 A | * | 7/1979 | Valentine | 361/18 |
| 5,563,500 A | * | 10/1996 | Muterspaugh | 323/282 |
| 5,578,916 A | * | 11/1996 | Muterspaugh | 323/267 |
| 7,031,130 B2 | * | 4/2006 | Simonelli et al. | 361/93.1 |

* cited by examiner

*Primary Examiner*—Ronald W. Leja
(74) *Attorney, Agent, or Firm*—Thomas, Kayden, Horstemeyer & Risley

(57) ABSTRACT

The present invention provides a power source protection device comprising a switching circuit and an overload circuit coupled between the switching circuit and power source for driving the switching circuit to limit current stopping the increase in the current output by the power source. Thus, the device is protected against overcurrent damage and maintains stable system operation.

10 Claims, 4 Drawing Sheets

PROTECTION DEVICE FOR POWER SOURCE AND ELECTRONIC DEVICE

BACKGROUND OF THE INVENTION

1. Field of the Invention

The present invention is relates in general to a protection device for a power source, and more specifically to the use of a switching circuit, an overload protection circuit, and a short protection circuit for protecting an electronic device.

2. Description of the Related Art

The simplest current limiting component is a fuse, and it can be used alone or with a protection component. The fuse is capable of preventing over current impact, hence it is essential to a system as it is the final defense against system breakdown.

Presently, there are two electron protection components for power supplies in common use. One is a general fuse, which has the drawback of only one time use, and requiring replacement change after burning out. Thus, it used a chance exists that must be returned to the manufacturer for maintenance.

Another type protection component is a poly switch, which possesses the advantage of continuous use after providing the protection function, with the defect of high operational temperature. FIG. 1 is a conventional temperature and current diagram of poly switch. A represents the characteristic curve of model nanoSMD, microSMD or miniSMD, B represents the characteristic curve of the model SMDH160. The protection current of poly switch increases with a temperature in the surrounding area causing the working range of voltage to be limited by the temperature in the FIG. 1. A poly switch, however, can be used continuously and only requires periodic replacement, thus it offers an advantage over the standard fuse.

The description of a poly switch is as follows. The poly switch can protect against circuit damage by adjusting itself resistance when high current occurs. Once the current goes back to predetermined level, the poly switch automatically reverts to the normal level of resistivity. These operational characteristics of the poly switch make it rational the ideal choice for power supply and communication applications, due to the fact that changing a battery or connecting device with USB plug may generate instant high current. The poly switch typically replaces traditional glass fuse in some circuits, but is used for mainly in USB applications.

The general fuse stops current by melting and the poly switch limits current by adjusting its impedance according to current passing. Both must be triggered by over current heat to implement the protection function in the induction circuit.

The general fuse and poly switch solutions are in widespread use, however, there is limitation above. Therefore, the present invention provides better temperature characteristics than a poly switch for limiting the current and stopping the output of a power source, and without replacement every time over current occurs.

SUMMARY OF THE INVENTION

Therefore, the object of the present invention is to provide a power source protection device, and more specifically to use a switching circuit, an overload protection circuit, and a short protection circuit for protecting an electronic device.

The present invention achieves the above-indicated objects by providing a power source protection device comprising a switching circuit, an overload protection circuit, and a short protection circuit.

The switch circuit comprises an input terminal coupled to a power source and an output terminal for outputting the power from the power source. When the current outputs from the power source equal or greater than a first predetermined current, the switching circuit is driven to limit the current stopping the increase in the current output by the power source. Thus, the device is protected against overcurrent damage and maintains stable system operation.

BRIEF DESCRIPTION OF THE DRAWINGS

The present invention can be more fully understood by reading the subsequent detailed description and examples with reference made to the accompanying drawings, wherein.

DETAILED DESCRIPTION OF THE INVENTION

First Embodiment

Figure 1:
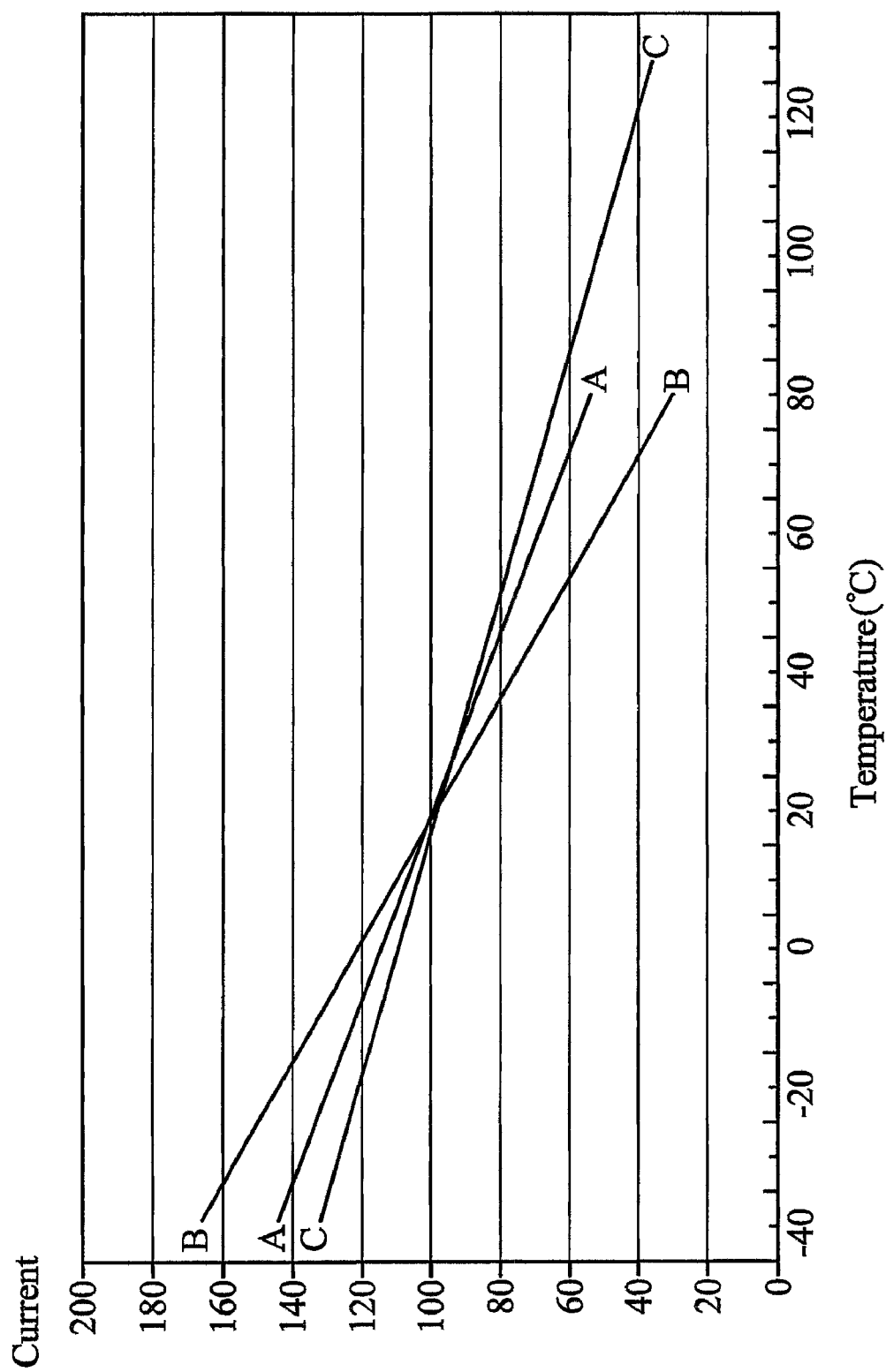
FIG. 1 is a characteristic diagram of temperature and current of a conventional.
Figure 2:
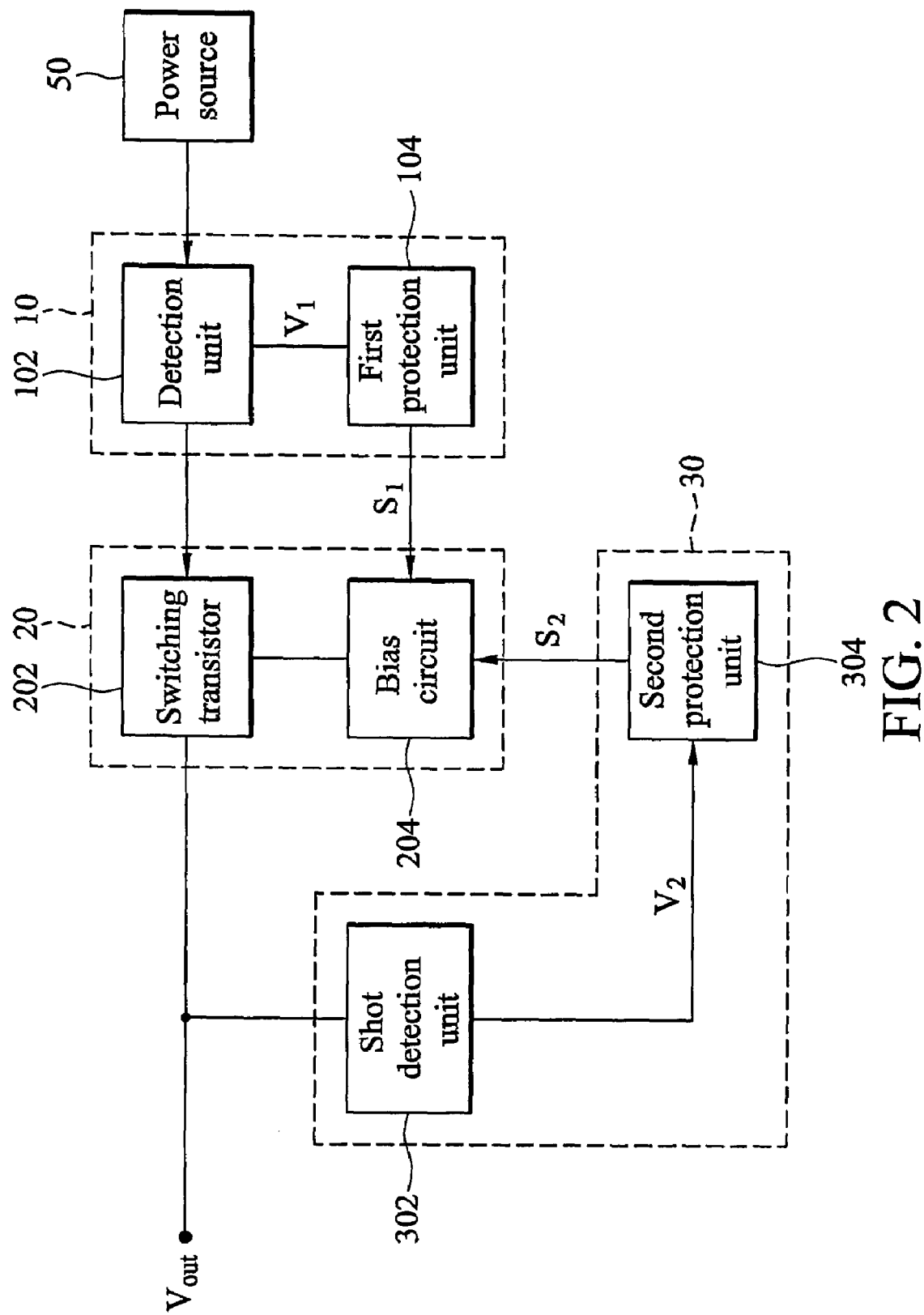
FIG. 2 is a block diagram of a power source protection device according to first embodiment of the present invention.

FIG. 2 is a block diagram of a power source protection device according to first embodiment of the present invention. A switching circuit 20 comprises a switching transistor 202 and a bias circuit 204 in FIG. 2. The input port of switching circuit 20 is coupled to a power source 50 and the output port outputs the power Vout. An overload protection circuit 10 is coupled between the switching circuit 20 and power source 50 comprising a detection unit 102 and a first protection circuit 104. A short protection circuit 30 comprising a short detection unit 302 and a second protection unit 304 is coupled to the output terminal of switching circuit 20.

The overload protection circuit 10 comprises the detection unit 102 and the first protection unit 104. The detection unit 102 is coupled between the input pole of switching transistor 202 and power source 50 for detecting the output current of the power source, when the current equal or greater than the first current level, an overload signal V1 is output. The first protection unit 104 is coupled to the output of detection unit 102. When the first protection unit 104 receives the overload signal V1, the first protection unit 104 can output a first control signal S1. The first control signal S1 passes through the bias circuit 204 to control the bias of the control pole of switching transistor 202 limit the current output by power source 50, to limit it in an acceptable current range.

The short protection circuit 30 comprises the short detection unit 302 and the second protection unit 304. The short detection unit 302 is coupled to the output terminal of switching circuit 20, when the output terminal of the switch circuit 20 is short, a short signal V2 is then output. The second protection unit 304 is coupled between the short detection unit 302 and the switching circuit 20, when the second protection unit 304 receives the short signal V2, a second control signal S2 is output. The second control signal S2 will change the bias that provides by the bias circuit for closing the switching transistor 202 that output the power Vout with the breakup for operating the protection of power source.

Second Embodiment

Figure 3:
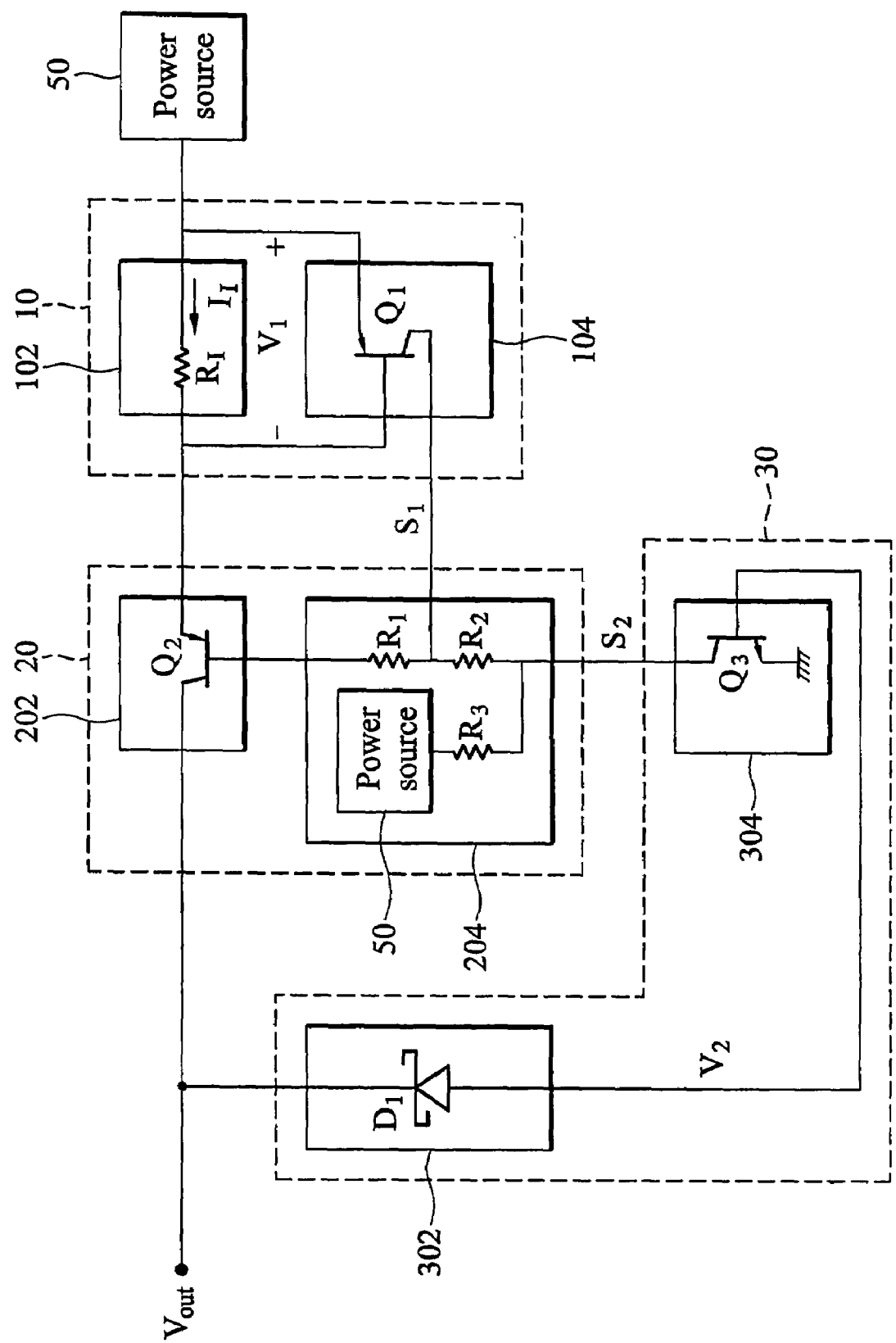
FIG. 3 is a block diagram of a power source protection device according to second embodiment of the present invention.

FIG. 3 is a block diagram of a power source protection device according to second embodiment of the present invention. The detection unit 102 comprises a starting resistor RI, first protection unit 104 comprises a first transistor Q1, switching transistor 202 comprises a second transistor Q2, short detection unit 302 comprises a schottky diode D1, and the bias circuit 204 comprised a first bias resistance R1, a second bias resistance R2, and a third bias resistance R3. The bias circuit 204 couples to the power source 50 and the control pole of second transistor Q2 of for providing a bias voltage to turn on the second transistor Q2, then passing the power through the emitter pole of second transistor Q2.

The starting resistance RI is coupled between the emitter of second transistor Q2 and power source 50 in FIG. 3. When the flow of current 11 of starting resistance RI satisfies a first current, wherein the product of current 11 and starting resistance RI is equal to a particular voltage, for example 0.6 volts. At this time, the starting resistance RI outputs an overload signal V1 (0.6 volts) to turn on the first transistor Q1. When the first transistor Q1 receives the overload signal V1 (0.6 volts), the first transistor Q1 then outputs a first control signal S1. The first control signal S1 passes thorough the first bias resistance R1 to control the bias of second transistor Q2 for driving the second transistor Q2 to limit the current output by power source 50 to within an acceptable current range.

The schottky diode D1 is coupled between the second transistor Q2 and the base of third transistor Q3. When the power Vout is short, the schottky diode D1 outputs a short signal V2 (0.2 volts) to the base of third transistor Q3, wherein the short signal V2 (0.2 volts) cuts off the third transistor Q3. The second control signal S2 passes through the second bias circuit directing the bias circuit 204 to close the second transistor Q2 outputting power Vout by breakup.

Third Embodiment

Figure 4:
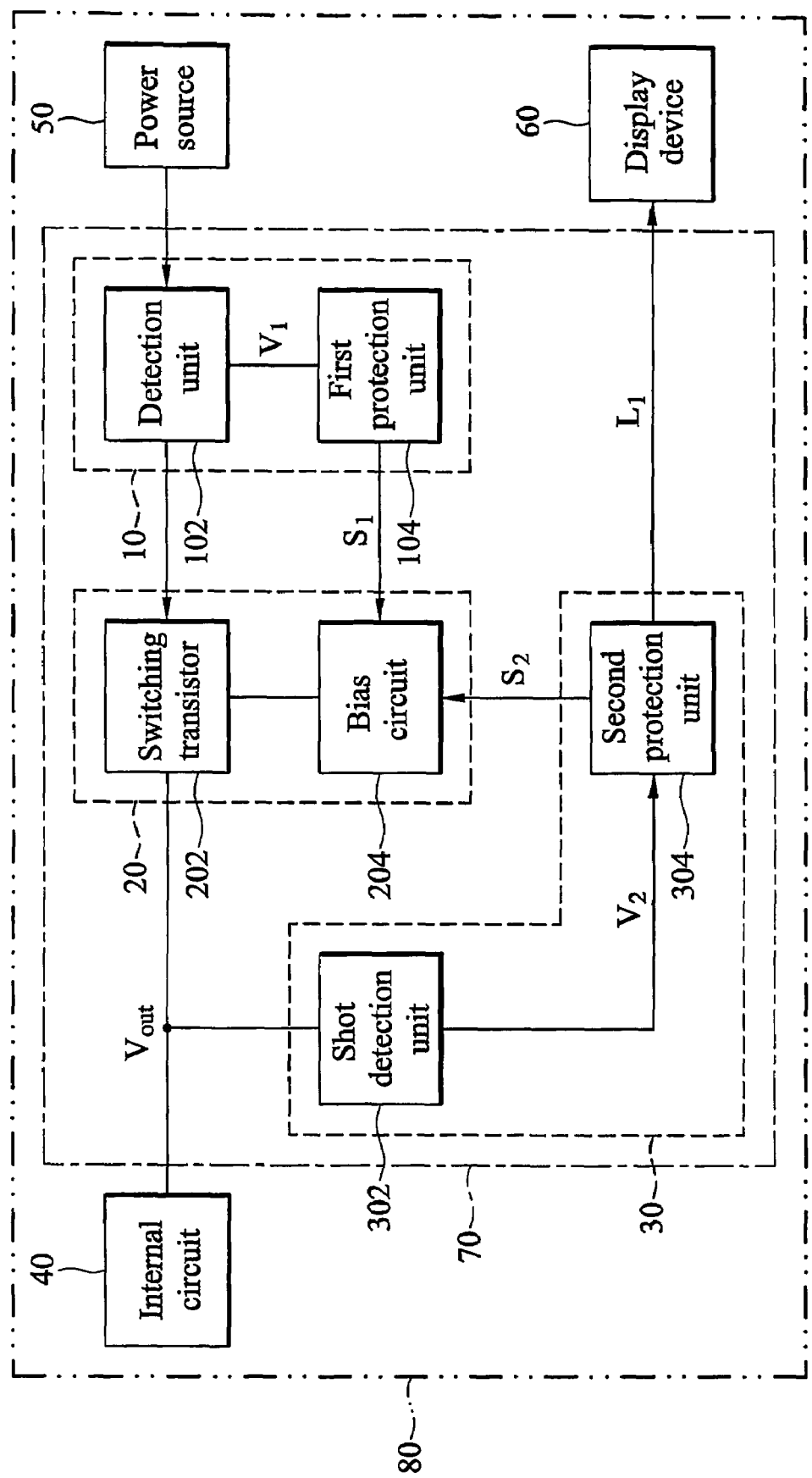
FIG. 4 is a block diagram of an electronic device with protection device according to third embodiment of the present invention.

FIG. 4 is a block diagram of an electronic device with protection device according to third embodiment of the present invention. The difference being a power protection device 70 in an electronic device 80 requires an internal circuit 40. The second protection unit 304 can also output a state signal L3 to display device 60 for displaying operational status on indication, current limiting or breakup output of power from switching circuit 20.

The present invention provides the following advantages over the related art. As the system or equipment functions only a short circuit or over current occurs, present invention protect presents damage to the system or equipment. The present invention has better temperature characteristics and provides improved over efficiency a poly switch.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power source protection device comprising:
   a switch circuit having an input port for receiving a power form a power source and an output port for outputting the power, wherein the switching circuit further comprising a switching transistor having an emitter pole coupled to the power source, and a bias circuit coupled to the power source and providing a bias voltage to a control pole of the switching transistor to turn on the switching transistor, then passing the power through the emitter pole;
   an overload protection circuit coupling between the switching circuit and the power source, when a current output from the power source equal or greater than a first predetermined value, the switching circuit limiting the current below the first predetermined value, the overload protection further comprising:
   a detection unit for detecting the current of the power source, when the current equal or greater than a first predetermined value, output an overload signal;
   a first protection unit coupling to the detection unit, when the first protection unit receiving the overload signal, the first protection unit outputting a first control signal for activated the switching circuit limit the current;
   a short protection circuit coupling to the output port, when the output port shorted, the short protection circuit activated the switching circuit closed for stopping the power output, the short protection further comprising:
   a short detection unit coupled to the output port, when a short occurring in the output port of the switching circuit, the short detection unit outputting a short signal;
   a second protection unit coupled between the short detection unit and the bias circuit, wherein a second control signal of the second protection unit transmitted to the bias circuit, and directing the bias circuit to activate the switching circuit closed for stopping the power output.

2. The power source protection device as claimed in claim 1, wherein the detection unit is a starting resistance coupled to the switching circuit and the power source.

3. The power source protection device as claimed in claim 1, wherein the control pole of the switching transistor is coupled to the first protection unit, the bias circuit adjusting the bias voltage according the first control signal.

4. The power source protection device as claimed in claim 1, wherein the control pole of the switching transistor is coupled to the second protection unit, the bias circuit adjusting the bias voltage according the second control signal.

5. The power source protection device as claimed in claim 1, wherein the short detection unit is a schottky diode.

6. A electronic device with protection device comprises:
   a power source;
   an internal circuit;
   a switch circuit having an input port for receiving a power form a power source and an output port for outputting the power to the internal circuit, wherein the switching circuit further comprising a switching transistor having an emitter pole coupled to the power source, and a bias circuit coupled to the power source and providing a bias voltage to a control pole of the switching transistor to turn on the switching transistor, then passing the power through the emitter pole;
   an overload protection circuit coupling between the switching circuit and the power source, when a current output from the power source equal or greater than a first predetermined value, the switching circuit limiting the current below the first predetermined value, the overload protection circuit further comprising:
   a detection unit for detecting the current of the power source, when the current equal or greater than a first predetermined value, output an overload signal;

a first protection unit coupling to the detection unit, when the first protection unit receiving the overload signal. the first protection unit outputting a first control signal for activated the switching circuit limit the current;

a short protection circuit coupling to the output port, when the internal circuit shorted, the short protection circuit activated the switching circuit closed for stopping the power output, the short protection circuit further comprising:

a short detection unit coupled to the output port, when a short occurring in the output port of the switching circuit, the short detection unit outputting a short signal;

a second protection unit coupled between the short detection unit and the bias circuit, wherein a second control signal of the second protection unit transmitted to the bias circuit, and directing the bias circuit to activate the switching circuit closed for stopping the power output.

7. The electronic device with protection device as claimed in claim 6, wherein the detection unit is a starting resistance coupled to the switching circuit and the power source.

8. The electronic device with protection device as claimed in claim 6, wherein the control pole of the switching transistor is coupled the first protection unit, the bias circuit adjusting the bias voltage according the first control signal.

9. The electronic device with protection device as claimed in claim 6, wherein the control pole of the switching transistor is coupled to the second protection unit, the bias circuit adjusting the bias voltage according the second control signal.

10. The electronic device with protection device as claimed in claim 6, wherein the short detection unit is a schottky diode.

* * * * *